(12) United States Patent  
Mure et al.

(10) Patent No.: US 11,078,306 B2
(45) Date of Patent: Aug. 3, 2021

(54) BIOMODAL POLYMERIZATION CATALYSTS

(71) Applicant: Univation Technologies, LLC, Houston, TX (US)

(72) Inventors: Cliff R. Mure, Middlesex, NJ (US); Timothy R. Lynn, Middlesex, NJ (US)

(73) Assignee: Univation Technologies, LLC, Houston, TX (US)

( * ) Notice: Subject to any disclaimer, the term of this patent is extended or adjusted under 35 U.S.C. 154(b) by 153 days.

(21) Appl. No.: 16/338,111

(22) PCT Filed: Sep. 26, 2017

(86) PCT No.: PCT/US2017/053427
§ 371 (c)(1),
(2) Date: Mar. 29, 2019

(87) PCT Pub. No.: WO2018/064035
PCT Pub. Date: Apr. 5, 2018

(65) Prior Publication Data
US 2020/0024376 A1  Jan. 23, 2020

Related U.S. Application Data

(60) Provisional application No. 62/402,592, filed on Sep. 30, 2016.

(51) Int. Cl.
*C08F 4/653* (2006.01)
*C08F 4/6592* (2006.01)
*C08F 210/16* (2006.01)
*C08F 10/02* (2006.01)
*C08F 4/659* (2006.01)
C08F 4/64 (2006.01)

(52) U.S. Cl.
CPC .......... *C08F 10/02* (2013.01); *C08F 4/65904* (2013.01); *C08F 4/65925* (2013.01); *C08F 4/64148* (2013.01); *C08F 210/16* (2013.01); *C08F 2420/03* (2013.01)

(58) Field of Classification Search
CPC .............. C08F 4/64148; C08F 4/65904; C08F 4/65925; C08F 210/16
See application file for complete search history.

(56) References Cited

U.S. PATENT DOCUMENTS

2006/0036041 A1  2/2006  Kwalk

FOREIGN PATENT DOCUMENTS

WO  2011087520  7/2011
WO  2013070602  5/2013

OTHER PUBLICATIONS

International Preliminary Report on Patentability for related PCT Application PCT/US2017/053427, dated Apr. 11, 2019 (7 pgs).
International Search Report & Written Opinion for related PCT Application PCT/US2017/053427, dated Feb. 6, 2018 (10 pgs).

*Primary Examiner* — Caixia Lu
(74) *Attorney, Agent, or Firm* — Brooks, Cameron & Huebsch, PLLC

(57) ABSTRACT

Embodiments of the present disclosure directed towards bimodal polymerization catalysts. As an example, the present disclosure provides a bimodal polymerization catalyst system including a non-metallocene olefin polymerization catalyst and a zirconocene catalyst of Formula I: (Formula I) where each of $R^1$, $R^2$, and $R^4$ are independently a $C_1$ to $C_{20}$ alkyl, aryl or aralkyl group or a hydrogen, where $R^3$ is a $C_1$ to $C_{20}$ alkyl, aryl or aralkyl group, and where each X is independently a halide, $C_1$ to $C_{20}$ alkyl, aralkyl group or hydrogen.

(Formula I)

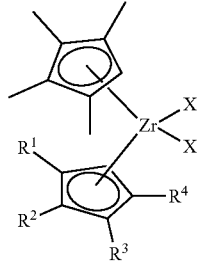

9 Claims, 2 Drawing Sheets

BIOMODAL POLYMERIZATION CATALYSTS

This application is a National Stage Application under 35 U.S.C. § 371 of International Application Number PCT/US2017/053427, filed Sep. 26, 2017 and published as WO 2018/064035 on Apr. 5, 2018, which claims the benefit to U.S. Provisional Application 62/402,592, filed Sep. 30, 2016, the entire contents of which are incorporated herein by reference in its entirety.

FIELD OF DISCLOSURE

Embodiments of the present disclosure are directed towards bimodal polymerization catalysts, more specifically, embodiments are directed towards bimodal polymerization catalysts that can be utilized to form bimodal polymers.

BACKGROUND

Polymers may be utilized for a number of products including films and pipes, among other. Polymers can be formed by reacting one or more types of monomer in a polymerization reaction. There is continued focus in the industry on developing new and improved materials and/or processes that may be utilized to form polymers.

Ethylene alpha-olefin (polyethylene) copolymers are typically produced in a low pressure reactor, utilizing, for example, solution, slurry, or gas phase polymerization processes. Polymerization takes place in the presence of catalyst systems such as those employing, for example, a Ziegler-Natta catalyst, a chromium based catalyst, a metallocene catalyst, or combinations thereof.

A number of catalyst compositions containing single site catalysts, e.g., metallocene, catalysts have been used to prepare polyethylene copolymers, producing relatively homogeneous copolymers at good polymerization rates. In contrast to traditional Ziegler-Natta catalyst compositions, single site catalyst compositions, such as metallocene catalysts, are catalytic compounds in which each catalyst molecule contains one or only a few polymerization sites. Single site catalysts may produce polyethylene copolymers that have a narrow molecular weight distribution. Although there are single site catalysts that can produce broader molecular weight distributions, polymers produced by these catalysts often show a narrowing of the molecular weight distribution (MWD) as the reaction temperature is increased, for example, to increase production rates. Further, a single site catalyst will often incorporate an amount of comonomer into the molecules of the polyethylene copolymer.

It is generally known in the art that a polyolefin's MWD affects different product attributes. Polymers having a broad molecular weight distribution may have improved physical and/or mechanical properties, such as stiffness, toughness, processibility, and environmental stress crack resistance (ESCR), among others.

To achieve these properties, bimodal polymers have become increasingly important in the polyolefin industry, with a variety of manufacturers offering products of this type. Bimodal polymers generally refer to polymers produced using two or more different catalyst types or two or more different reactor environments, such that the resultant polymers have a bimodal molecular weight distribution typically including a low molecular weight component and a high molecular weight component (having a comparatively high molecular weight and/or range of molecular weights than the low molecular weight component). Whereas older technology relied on two-reactor systems to generate such material, advances in catalyst design and supporting technology have allowed for the development of single reactor bimetallic catalyst systems capable of producing bimodal high density polyethylene (HDPE). These systems are attractive both from a cost perspective and ease of use.

Control of these properties is obtained for the most part by the choice of the catalyst system. Thus, the catalyst design is important for producing polymers that are attractive from a commercial standpoint. Because of the improved physical properties of polymers with the broad molecular distributions needed for commercially desirable products, there exists a need for controlled techniques and/or materials for forming polyethylene copolymers having a desirable molecular weight distribution and/or having a desired distribution of comonomer between a high molecular weight polyethylene component and a low molecular weight polyethylene component of a bimodal polyethylene composition.

SUMMARY

Figure 1:
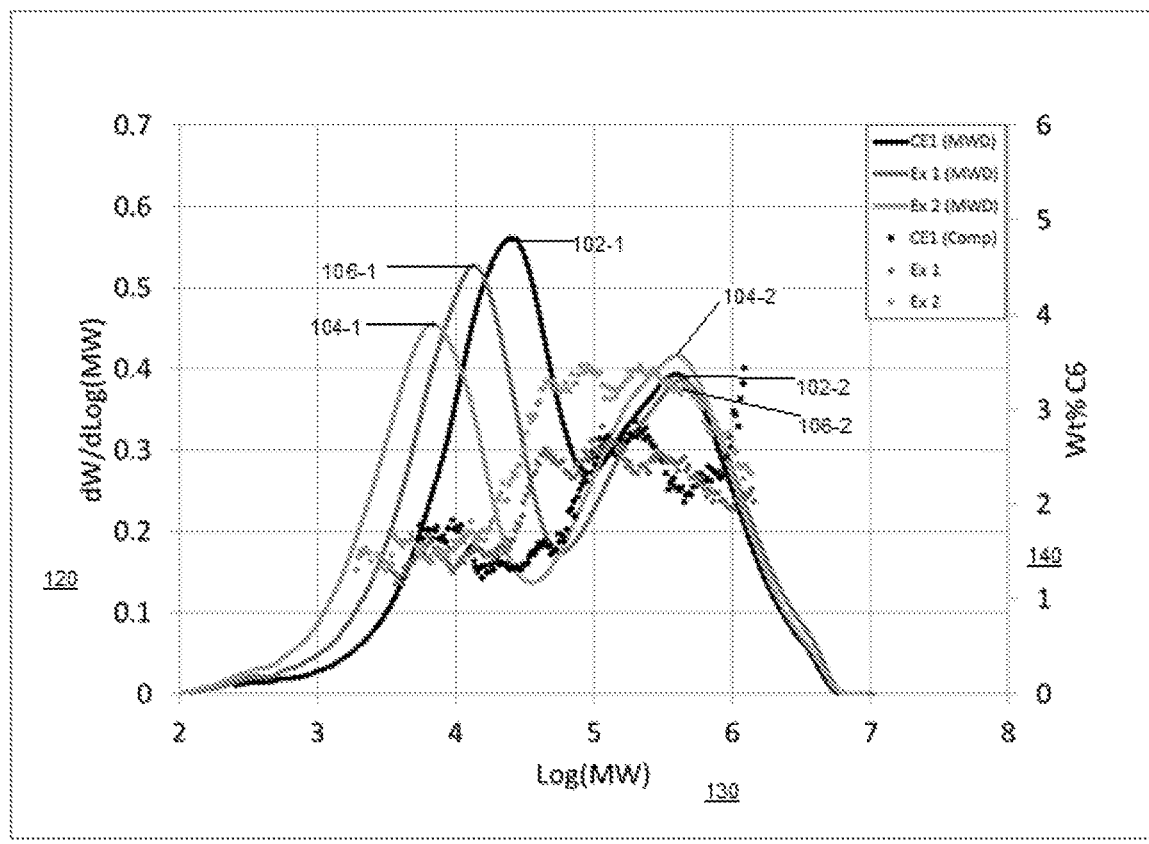
FIG. 1 is a representative plot of molecular weight distribution of polyolefin polymerized with a bimodal polymerization catalyst system that includes a non-metallocene olefin polymerization catalyst and a zirconocene catalyst of Formula I, in accordance with embodiments described herein.

The present disclosure provides bimodal polymerization catalyst systems including a non-metallocene olefin polymerization catalyst and a zirconocene catalyst of Formula I:

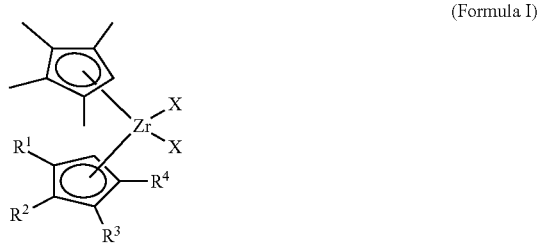

(Formula I)

where each of $R^1$, $R^2$, $R^3$, and $R^4$, are independently a $C_1$ to $C_{20}$ alkyl, aryl or aralkyl group or a hydrogen, where $R_3$ is a $C_1$ to $C_{20}$ alkyl, aryl or aralkyl group, and where each X is independently a halide, $C_1$ to $C_{20}$ alkyl, aralkyl group or hydrogen.

The present disclosure provides bimodal polyethylene compositions including a high molecular weight polyethylene component and a low molecular weight polyethylene component, where the ratio of the weight average molecular weight of the high molecular weight component to the weight average molecular weight of the low molecular weight component of the composition is from 1:3 to 1:50, and where the high and low molecular weight polyethylene components are together formed in a single reactor via a bimodal polymerization catalyst system including a non-metallocene olefin polymerization catalyst and a zirconocene catalyst of Formula I, as described herein.

The present disclosure provides methods of producing bimodal polyethylene, the methods including polymerizing ethylene in a reactor in presence of a bimodal polymerization catalyst system to form the polyethylene, where the bimodal polymerization catalyst system includes a non-metallocene olefin polymerization catalyst and a zirconocene catalyst of Formula I, as described herein.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Bimodal polymerization catalyst systems, bimodal polyethylene compositions formed via bimodal polymerization catalyst systems, and methods of producing bimodal polyethylene employing bimodal polymerization catalyst systems are described herein. Bimodal polymerization catalyst systems include a zirconocene catalyst of Formula I, as described herein. In general, the present techniques are directed to the zirconocene catalyst of Formula I that improves polymerization economics and gives desirable polymer properties. For instance, bimodal polymerization catalyst systems including the zirconocene catalyst of Formula I can be employed in a single reactor to form bimodal polyethylene compositions having desirable properties such as a desirable (e.g., broad) molecular weight distribution and/or having a desired distribution of comonomer between a high molecular weight polyethylene component and a low molecular weight polyethylene component of a bimodal polyethylene composition.

In various embodiments, a zirconocene catalyst of Formula I may be selected to produce a low molecular weight component corresponding to a first peak in a molecular weight distribution plot of a bimodal polyethylene composition, as described herein. Of course, other metallocene catalysts, as described herein, may be employed in addition to the zirconocene catalyst of Formula I. A non-metallocene, as described herein, may be selected to produce a higher molecular weight component corresponding to a second peak in a molecular weight distribution plot of a bimodal polyethylene composition, as described herein.

FIG. 1 is a representative plot 100 of molecular weight distribution of polyolefin produced with a bimodal polymerization catalyst system that includes a non-metallocene olefin polymerization catalyst and a zirconocene catalyst of Formula I, in accordance with embodiments described herein. In the plot 100, the x-axis 130 represents a log of a molecular weight of a polymer, a first y-axis 120 represents a differential of an amount of the polymer at various molecular weights of the polymer, a second y-axis 140 represents (as $C_6$ wt %) an amount of comonomer (i.e., 1-hexene) in a polyethylene.

FIG. 1 illustrates a molecular weight distribution plots of bimodal polyethylene of Example 1, Example 2, and Comparative Example 1, as described herein. As mentioned, the bimodal polyethylenes include a high molecular weight polyethylene component and a low molecular weight polyethylene component.

In various embodiments herein a high molecular weight polyethylene component (i.e., polyethylene having a weight average molecular weight from 400,000 to 700,000 g/mol as represented by a second peak in a molecular weight distribution of the polyethylene) comprises a polyethylene having an amount of 1-hexene comonomer present in an amount from 3.0 weight percent (wt. %) of the polyethylene to 6.0 wt. % of the polyethylene. In various embodiments herein a low molecular weight polyethylene component (polyethylene having a weight average molecular weight from 5,000 to 35,000 g/mol as represented by a first peak in a molecular weight distribution of the polyethylene) comprises a polyethylene having an amount of 1-hexene comonomer present in an amount from 1.5 wt. % of the polyethylene to 2.5 wt. % of the polyethylene.

The ratio of the Mw for a low molecular weight component to the Mw for a high molecular weight component can be between 1:1 and 1:30, or about 1:2 and 1:5, among other possibilities.

Catalyst Compounds
Zirconocene Catalyst Compounds

Zirconocene catalysts are a type of a metallocene catalyst. Metallocene catalyst compounds can include "half sandwich" and/or "full sandwich" compounds having one or more Cp ligands (e.g., cyclopentadienyl and ligands isolobal to cyclopentadienyl) bound to at least one Group 3 to Group 12 metal atom, and one or more leaving groups bound to the at least one metal atom. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring systems, at least a portion of which includes π-bonded systems, such as cycloalkadienyl ligands and heterocyclic analogues. The rings or ring systems typically include atoms selected from the group consisting of Groups 13 to 16 atoms, and, in a particular exemplary embodiment, the atoms that make up the Cp ligands are selected from the group consisting of carbon, nitrogen, oxygen, silicon, sulfur, phosphorous, germanium, boron, aluminum, and combinations thereof, where carbon makes up at least 50% of the ring members. In a more particular exemplary embodiment, the Cp ligands are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenly, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$ Ind"), substituted versions thereof (as discussed and described in more detail below), and heterocyclic versions thereof.

The metal atom "M" of the metallocene catalyst compound can be selected from the group consisting of Groups 3 through 12 atoms and lanthanide Group atoms in one exemplary embodiment; and selected from the group consisting of Groups 3 through 10 atoms in a more particular exemplary embodiment, and selected from the group consisting of Sc, Ti, Zr, Hf, V, Nb, Ta, Mn, Re, Fe, Ru, Os, Co, Rh, Ir, and Ni in yet a more particular exemplary embodiment; and selected from the group consisting of Groups 4, 5, and 6 atoms in yet a more particular exemplary embodiment, and Ti, Zr, Hf atoms in yet a more particular exemplary embodiment, and Hf in yet a more particular exemplary embodiment. The oxidation state of the metal atom "M" can range from 0 to +7 in one exemplary embodiment; and in a more particular exemplary embodiment, can be +1, +2, +3, +4, or +5; and in yet a more particular exemplary embodiment can be +2, +3 or +4. The groups bound to the metal atom "M" are such that the compounds described below in the formulas and structures are electrically neutral, unless otherwise indicated. The Cp ligand forms at least one chemical bond with the metal atom M to form the "metallocene catalyst compound." The Cp ligands are distinct from the leaving groups bound to the catalyst compound in that they are not highly susceptible to substitution/abstraction reactions.

As mentioned, bimodal polymerization catalyst systems can include a metallocene, for instance, the zirconocene catalyst of Formula I:

(Formula I)

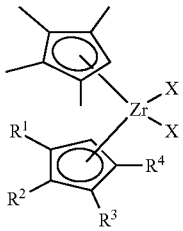

where each of $R^1$, $R^2$, $R^3$, and $R^4$, are independently a $C_1$ to $C_{20}$ alkyl, aryl or aralkyl group or a hydrogen, where $R^3$ is a $C_1$ to $C_{20}$ alkyl, aryl or aralkyl group, and where each X is independently a halide, $C_1$ to $C_{20}$ alkyl, aralkyl group or hydrogen. Stated differently, each of $R^1$, $R^2$, $R^3$, and $R^4$, are independently a $C_1$ to $C_{20}$ alkyl, a C6 to C20 aryl or C7 to C20 aralkyl group or a hydrogen. Further, in Formula I it is understood that the 'top' Cp ligand (opposite the 'bottom' Cp ligand that includes $R^1$, $R^2$, $R^3$, and $R^4$) illustrates four —CH3 group ("methyl").

As used herein, the phrase "catalyst system" or "bimodal catalyst system" includes at least one "catalyst component" and at least one "activator", both of which are described further herein. The catalyst system may also include other components, such as supports, etc., and is not limited to the catalyst component and/or activator alone or in combination. The catalyst system may include any number of catalyst components in any combination as described herein, as well as any activator in any combination as described herein.

As used herein, the phrase "catalyst compound" includes any compound that, once appropriately activated, is capable of catalyzing the polymerization or oligomerization of olefins.

As used herein, the phrase "leaving group" refers to one or more chemical moieties bound to the metal center of the catalyst component that can be abstracted from the catalyst component by an activator, thus producing the species active towards olefin polymerization or oligomerization.

As used herein, a "hydrocarbyl" includes aliphatic, cyclic, olefinic, acetylenic and aromatic radicals (i.e., hydrocarbon radicals) comprising hydrogen and carbon that are deficient by one hydrogen. A "hydrocarbylene" is deficient by two hydrogens.

As used herein, an "alkyl" includes linear, branched and cyclic paraffin radicals that are deficient by one hydrogen. Thus, for example, a —CH3 group ("methyl") and a CH3CH2— group ("ethyl") are examples of alkyls.

As used herein, an "alkenyl" includes linear, branched and cyclic olefin radicals that are deficient by one hydrogen; alkynyl radicals include linear, branched and cyclic acetylene radicals deficient by one hydrogen radical.

As used herein, "aryl" groups include phenyl, naphthyl, pyridyl and other radicals whose molecules have the ring structure characteristic of benzene, naphthylene, phenanthrene, anthracene, etc. It is understood that an "aryl" group can be a C6 to C20 aryl group. For example, a C6H5—aromatic structure is an "phenyl", a C6H4 2—aromatic structure is an "phenylene". An "arylalkyl" group is an alkyl group having an aryl group pendant therefrom. It is understood that an "aralkyl" group can be a C7 to C20 aralkyl group. An "alkylaryl" is an aryl group having one or more alkyl groups pendant therefrom.

As used herein, an "alkylene" includes linear, branched and cyclic hydrocarbon radicals deficient by two hydrogens. Thus, —$CH_2$—("methylene") and —$CH_2CH_2$—("ethylene") are examples of alkylene groups. Other groups deficient by two hydrogen radicals include "arylene" and "alkenylene".

As used herein, the phrase "heteroatom" includes any atom other than carbon and hydrogen that can be bound to carbon, and in one embodiment is selected from the group consisting of B, Al, Si, Ge, N, P, O, and S. A "heteroatom-containing group" is a hydrocarbon radical that contains a heteroatom and may contain one or more of the same or different heteroatoms, and from 1 to 3 heteroatoms in a particular embodiment. Non-limiting examples of heteroatom-containing groups include radicals of imines, amines, oxides, phosphines, ethers, ketones, oxoazolines heterocyclics, oxazolines, thioethers, and the like.

As used herein, an "alkylcarboxylate", "arylcarboxylate", and "alkylarylcarboxylate" is an alkyl, aryl, and alkylaryl, respectively, that possesses a carboxyl group in any position. Examples include $C_6H_5CH_2C(O)O^-$, $CH_3C(O)O^-$, etc.

As used herein, an aralkyl group is defined to be a substituted aryl group.

As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, $C_1$ to $C_{20}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

In various embodiments $R^1$ can be a $C_1$ to $C_{20}$ alkyl, aryl or aralkyl group. For instance, in some embodiments $R^1$ can be a $C_1$ to $C_{20}$ alkyl such as a $C_1$ alkyl, among other possibilities.

In various embodiments $R^2$, can be a $C_1$ to $C_{20}$ alkyl, aryl or aralkyl group. For instance, in some embodiments $R^2$ can be a $C_1$ to $C_{20}$ alkyl such as a C3 alkyl (e.g., a linear C3 alkyl), among other possibilities.

However, the disclosure is not so limited. Rather, in some embodiments $R^1$, and $R^2$, can together form a cyclic group and/or a heterocyclic group. The cyclic group and/or a heterocyclic group can by a cycloalkyl group, for instance, the cyclohexyl included in Formula II, among other possibilities. The cyclic group and/or a heterocyclic group can include at least one substituent group formed of a $C_1$ to $C_{20}$ alkyl, aryl or aralkyl group, in some embodiments (not illustrated). $R^1$, and $R^2$, may be interconnected to each other.

(Formula II)

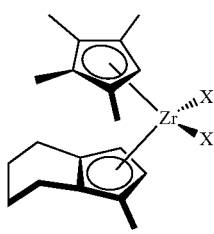

where each X is independently halide, $C_1$ to $C_{20}$ alkyl, aralkyl group or hydrogen.

In various embodiments $R^4$ can be a $C_1$ to $C_{20}$ alkyl, aryl or aralkyl group or hydrogen group. For instance, in some embodiments, $R^4$ can be $C_1$ to $C_{20}$ alkyl such as a $C_1$ alkyl, among other possibilities. In some embodiments, $R^4$ can be a hydrogen.

In various embodiments, $R^3$ can be a $C_1$ to $C_{20}$ alkyl, aryl or aralkyl group. For instance, in various embodiments, $R^3$ can be a $C_1$ to $C_{20}$ alkyl such a $C_1$ alkyl as illustrated in Formula III, among other possibilities.

(Formula III)

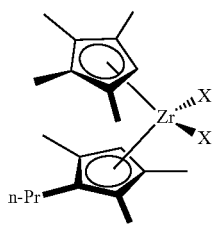

where each X is independently halide, $C_1$ to $C_{20}$ alkyl, aralkyl group or hydrogen.

As mentioned, in various embodiments, each X can independently be a halide, $C_1$ to $C_{20}$ alkyl, aralkyl group or hydrogen. For instance, in some embodiments, each X can independently be a $C_1$ to $C_{20}$ alkyl such as a $C_1$ alkyl and/or a $C_3$ alkyl, among other possibilities.

Non-metallocene olefin polymerization catalyst Compounds

The non-metallocene olefin polymerization catalyst may be a Group 15 metal-containing catalyst compound. That is, the bimodal polymerization catalyst system can include one or more Group 15 metal-containing catalyst compounds. As used herein, these are termed non-metallocene olefin polymerization catalyst compounds. The Group 15 metal-containing compound generally includes a Group 3 to 14 metal atom, a Group 3 to 7, or a Group 4 to 6 metal atom. In many embodiments, the Group 15 metal-containing compound includes a Group 4 metal atom bound to at least one leaving group and also bound to at least two Group 15 atoms, at least one of which is also bound to a Group 15 or 16 atom through another group.

In one or more embodiments, at least one of the Group 15 atoms is also bound to a Group 15 or 16 atom through another group which may be a C1 to C20 hydrocarbon group, a heteroatom containing group, silicon, germanium, tin, lead, or phosphorus, where the Group 15 or 16 atom may also be bound to nothing or a hydrogen, a Group 14 atom containing group, a halogen, or a heteroatom containing group, and where each of the two Group 15 atoms are also bound to a cyclic group and can optionally be bound to hydrogen, a halogen, a heteroatom or a hydrocarbyl group, or a heteroatom containing group.

The Group 15-containing metal compounds can be described more particularly with structures (IX) or (X):

(IX)

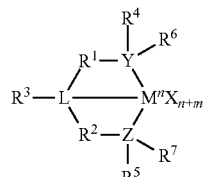

(X)

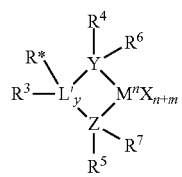

where M is a Group 3 to 12 transition metal or a Group 13 or 14 main group metal, a Group 4, 5, or 6 metal. In many embodiments, M is a Group 4 metal, such as zirconium, titanium, or hafnium. Each X is independently a leaving group, such as an anionic leaving group. The leaving group may include a hydrogen, a hydrocarbyl group, a heteroatom, a halogen, or an alkyl; y is 0 or 1 (when y is 0 group L' is absent). The term 'n' is the oxidation state of M. In various embodiments, n is +3, +4, or +5. In many embodiments, n is +4. The term 'm' represents the formal charge of the YZL or the YZL' ligand, and is 0, −1, −2 or −3 in various embodiments. In many embodiments, m is −2. L is a Group 15 or 16 element, such as nitrogen or oxygen; L' is a Group 15 or 16 element or Group 14 containing group, such as carbon, silicon or germanium. Y is a Group 15 element, such as nitrogen or phosphorus. In many embodiments, Y is nitrogen. Z is a Group 15 element, such as nitrogen or phosphorus. In many embodiments, Z is nitrogen. $R^1$ and $R^2$ are, independently, a $C_1$ to $C_{20}$ hydrocarbon group, a heteroatom containing group having up to twenty carbon atoms, silicon, germanium, tin, lead, or phosphorus. In many embodiments, $R^1$ and $R^2$ are a $C_2$ to $C_{20}$ alkyl, aryl or aralkyl group, such as a linear, branched or cyclic $C_2$ to $C_{20}$ alkyl group, or a $C_2$ to $C_6$ hydrocarbon group. $R^1$ and $R^2$ may also be interconnected to each other. $R^3$ may be absent or may be a hydrocarbon group, a hydrogen, a halogen, a heteroatom containing group. In many embodiments, $R^3$ is absent, for example, if L is an oxygen, or a hydrogen, or a linear, cyclic, or branched alkyl group having 1 to 20 carbon atoms. $R^4$ and $R^5$ are independently an alkyl group, an aryl group, substituted aryl group, a cyclic alkyl group, a substituted cyclic alkyl group, a cyclic aralkyl group, a substituted cyclic aralkyl group, or multiple ring system, often having up to 20 carbon atoms. In many embodiments, $R^4$ and $R^5$ have between 3 and 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other. $R^6$ and $R^7$ are independently absent, hydrogen, an alkyl group, halogen, heteroatom, or a hydrocarbyl group, such as a linear, cyclic or branched alkyl group having 1 to 20 carbon atoms. In many embodiments, $R^6$ and $R^7$ are absent. $R^*$ may be absent, or may be a hydrogen, a Group 14 atom containing group, a halogen, or a heteroatom containing group.

By "formal charge of the YZL or YZL' ligand," it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

In one or more embodiments, $R^4$ and $R^5$ are independently a group represented by the following structure (XI).

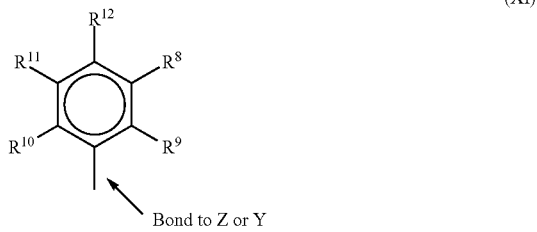

when $R^4$ and $R^5$ are independently an alkyl group, an aryl group, substituted aryl group, a cyclic alkyl group, a substituted cyclic alkyl group, a cyclic aralkyl group, a substituted cyclic aralkyl group, or multiple ring system, often having up to 20 carbon atoms. In many embodiments, $R^4$ and $R^5$ have between 3 and 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other, $R^8$ to $R^{12}$ are each independently hydrogen, a $C_1$ to $C_{40}$ alkyl group, a halide, a heteroatom, a heteroatom containing group containing up to 40 carbon atoms. In many embodiments, $R^8$ to $R^{12}$ are a $C_1$ to $C_{20}$ linear or branched alkyl group, such as a methyl, ethyl, propyl, or butyl group. Any two of the R groups may form a cyclic group and/or a heterocyclic group. The cyclic groups may be aromatic. In one embodiment $R^9$, $R^{10}$ and $R^{12}$ are independently a methyl, ethyl, propyl, or butyl group (including all isomers). In another embodiment, $R^9$, $R^{10}$ and $R^{12}$ are methyl groups, and $R^8$ and $R^{11}$ are hydrogen.

In one or more embodiments, $R^4$ and $R^5$ are both a group represented by the following structure (XII).

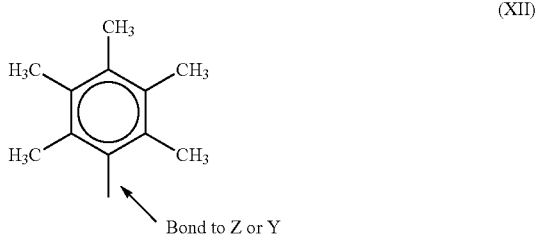

When $R^4$ and $R^5$ follow structure (XII), M is a Group 4 metal, such as zirconium, titanium, or hafnium. In many embodiments, M is zirconium. Each of L, Y, and Z may be a nitrogen. Each of $R^1$ and $R^2$ may be —$CH_2$—$CH_2$—. $R^3$ may be hydrogen, and $R^6$ and $R^7$ may be absent.

Catalyst Forms

The bimodal polymerization catalyst system may include a catalyst component in a slurry, which may have an initial catalyst compound, and an added solution catalyst component that is added to the slurry. Generally, a non-metallocene olefin polymerization catalyst will be supported in the initial slurry, depending on solubility. However, in some embodiments, the initial catalyst component slurry may have no catalysts but may have an activator or support. In this case, two or more solution catalysts may be added to the slurry to cause each to be supported.

Any number of combinations of catalyst components may be used in embodiments. For example, the catalyst component slurry can include an activator and a support, or a supported activator. Further, the slurry can include a catalyst compound in addition to the activator and the support. As noted, the catalyst compound in the slurry may be supported.

The slurry may include one or more activators and supports, and one more catalyst compounds. For example, the slurry may include two or more activators (such as alumoxane and a modified alumoxane) and a catalyst compound, or the slurry may include a supported activator and more than one catalyst compounds. In one embodiment, the slurry includes a support, an activator, and two catalyst compounds. In another embodiment the slurry includes a support, an activator and two different catalyst compounds, which may be added to the slurry separately or in combination. The slurry, containing silica and alumoxane, may be contacted with a catalyst compound, allowed to react, and thereafter the slurry is contacted with another catalyst compound, for example, in a trim system.

The molar ratio of metal in the activator to metal in the catalyst compound in the slurry may be 1000:1 to 0.5:1, 300:1 to 1:1, or 150:1 to 1:1. The slurry can include a support material which may be any inert particulate carrier material known in the art, including, but not limited to, silica, fumed silica, alumina, clay, talc or other support materials such as disclosed above. In one embodiment, the slurry contains silica and an activator, such as methyl aluminoxane ("MAO"), modified methyl aluminoxane ("MMAO"), as discussed further below.

One or more diluents or carriers can be used to facilitate the combination of any two or more components of the catalyst system in the slurry or in the trim catalyst solution. For example, the single site catalyst compound and the activator can be combined together in the presence of toluene or another non-reactive hydrocarbon or hydrocarbon mixture to provide the catalyst mixture. In addition to toluene, other suitable diluents can include, but are not limited to, ethylbenzene, xylene, pentane, hexane, heptane, octane, other hydrocarbons, or any combination thereof. The support, either dry or mixed with toluene can then be added to the catalyst mixture or the catalyst/activator mixture can be added to the support.

The catalyst is not limited to a slurry arrangement, as a mixed catalyst system may be made on a support and dried. The dried catalyst system can then be fed to the reactor through a dry feed system.

Support

As used herein, the terms "support" and "carrier" are used interchangeably and refer to any support material, including a porous support material, such as talc, inorganic oxides, and inorganic chlorides. The one or more single site catalyst compounds of the slurry can be supported on the same or separate supports together with the activator, or the activator can be used in an unsupported form, or can be deposited on a support different from the single site catalyst compounds, or any combination thereof. This may be accomplished by any technique commonly used in the art. There are various other methods in the art for supporting a single site catalyst compound. The single site catalyst compounds of the slurry can be spray dried. The support used with the single site catalyst compound can be functionalized, or at least one substituent or leaving group is selected. The support material may be any of the conventional support materials.

Preferably the supported material is a porous support material, for example, talc, an inorganic oxide, or an inorganic chloride. Other support materials include resinous support materials (e.g., polystyrene), functionalized or crosslinked organic supports, such as polystyrene divinyl benzene polyolefins or polymeric compounds, zeolites, clays, or any other organic or inorganic support material and the like, or mixtures thereof.

Preferred support materials are inorganic oxides that include those Group 2, 3, 4, 5, 13 or 14 metal oxides. The preferred supports include silica, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-BI 0 5 11 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 BI.

Other support materials include nanocomposites as described in PCT WO 99/47598, aerogels as described in WO 99/48605, spherulites as described in U.S. Pat. No. 5,972,510 and polymeric beads as described in WO 99/5031 1. An example of a suitable support is fumed silica available under the trade name Cabosil™ TS-610, or other TS- or TG-series supports, available from Cabot Corporation. Fumed silica is typically a silica with particles 7 to 30 nanometers in size that has been treated with dimethylsilyl-dichloride such that a majority of the surface hydroxyl groups are capped.

It is typically preferred that the support material, preferably an inorganic oxide, has a surface area in the range of from about 10 to about 700 m/g, pore volume in the range of from about 0.1 to about 4.0 cc/g and average particle size in the range of from about 5 to about 500 μm. More preferably, the surface area of the support material is in the range of from about 50 to about 500 m/g, pore volume of from about 0.5 to about 3.5 cc/g and average particle size of from about 10 to about 200 μm. Most preferably the surface area of the support material is in the range is from about 100 to about 400 m/g, pore volume from about 0.8 to about 3.0 cc/g and average particle size is from about 5 to about 100 μm. The average pore size of the carrier typically has pore size in the range of from 10 to IOOOA, preferably 50 to about 500 A, and most preferably 75 to about 350 A.

The support materials may be treated chemically, for example with a fluoride compound as described in WO 00/12565. Other supported activators are described in for example WO 00/13792 that refers to supported boron containing solid acid complex.

In a method of forming a supported catalyst composition component, the amount of liquid in which the activator is present is in an amount that is less than four times the pore volume of the support material, more preferably less than three times, even more preferably less than two times; preferred ranges being from 1.1 times to 3.5 times range and most preferably in the 1.2 to 3 times range. In an alternative embodiment, the amount of liquid in which the activator is present is from one to less than one times the pore volume of the support material utilized in forming the supported activator. Procedures for measuring the total pore volume of a porous support are well known in the art Activator As used herein, the term "activator" may refer to any compound or combination of compounds, supported, or unsupported, which can activate a single site catalyst compound or component, such as by creating a cationic species of the catalyst component. For example, this can include the abstraction of at least one leaving group (the "X" group in the single site catalyst compounds described herein) from the metal center of the single site catalyst compound/component. The activator may also be referred to as a "co-catalyst".

For example, the activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as tri (n-butyl)ammonium tetrakis(pentafluorophenyl) boron, a trisperfluorophenyl boron metalloid precursor, a trisperfluoronaphthyl boron metalloid precursor, or any combinations thereof.

Aluminoxanes can be described as oligomeric aluminum compounds having—Al(R)—O— subunits, where R is an alkyl group. Examples of aluminoxanes include, but are not limited to MAO, MMAO, ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. MMAOs are generally more soluble in aliphatic solvents and more stable during storage. There are a variety of methods for preparing aluminoxane and modified aluminoxanes.

As noted above, one or more organo-aluminum compounds such as one or more alkylaluminum compounds can be used in conjunction with the aluminoxanes. For example, alkylaluminum species that may be used are diethylaluminum ethoxide, diethylaluminum chloride, and/or diisobutylaluminum hydride. Examples of trialkylaluminum compounds include, but are not limited to, trimethylaluminum, triethylaluminum ("TEAL"), triisobutylaluminum ("TiBAI"), tri-n-hexylaluminum, tri-n-octylaluminum, tripropylaluminum, tributylaluminum, and the like.

Catalyst Component Solution

The catalyst component solution may include only a catalyst compound, such as a zirconocene, or may include an activator in addition to the catalyst compound. The catalyst solution used in the trim process can be prepared by dissolving the catalyst compound and optional activators in a liquid solvent. The liquid solvent may be an alkane, such as a C5 to C30 alkane, or a C5 to C10 alkane. Cyclic alkanes such as cyclohexane and aromatic compounds such as toluene may also be used. In addition, mineral oil may be used as a solvent. The solution employed should be liquid under the feed conditions to the polymerization reactor, and relatively inert. In one embodiment, the liquid utilized in the catalyst compound solution is different from the diluent used in the catalyst component slurry. In another embodiment, the liquid utilized in the catalyst compound solution is the same as the diluent used in the catalyst component solution.

If the catalyst solution includes both activator and catalyst compound, the ratio of metal in the activator to metal in the catalyst compound in the solution may be 1000:1 to 0.5:1, 300:1 to 1:1, or 150:1 to 1:1. In various embodiments, the activator and catalyst compound are present in the solution at up to about 90 wt. %, at up to about 50 wt. %, at up to about 20 wt. %, up to about 10 wt. %, at up to about 5 wt. %, at less than 1 wt. %, or between 100 ppm and 1 wt. %, based upon the weight of the solvent and the activator or catalyst compound.

The catalyst component solution can comprises any one of the soluble catalyst compounds described in the catalyst section herein. As the catalyst is dissolved in the solution, a higher solubility is desirable. Accordingly, the catalyst compound in the catalyst component solution may often include a metallocene, which may have higher solubility than other catalysts.

In the polymerization process, described below, any of the above described catalyst component containing solutions may be combined with any of the catalyst component containing slurry/slurries described above. In addition, more than one catalyst component solution may be utilized.

Continuity Additive/Static Control Agent

In gas-phase polyethylene production processes, it may be desirable to use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the single site catalyst compounds being used.

Control agents such as aluminum stearate may be employed. The static control agent used may be selected for its ability to receive the static charge in the fluidized bed without adversely affecting productivity. Other suitable static control agents may also include aluminum distearate, ethoxlated amines, and anti-static compositions such as those provided by Innospec Inc. under the trade name OCTASTAT. For example, OCTASTAT 2000 is a mixture of a polysulfone copolymer, a polymeric polyamine, and oil-soluble sulfonic acid.

The aforementioned control agents and other control agents may be employed either alone or in combination as a control agent. For example, the carboxylate metal salt may be combined with an amine containing control agent (e.g., a carboxylate metal salt with any family member belonging to the KEMAMINE® (available from Crompton Corporation) or ATMER® (available from ICI Americas Inc.) family of products).

Other useful continuity additives include ethyleneimine additives useful in embodiments disclosed herein may include polyethyleneimines having the following general formula:

—($CH_2$—$CH_2$—$NH$)$_n$—, in which n may be from about 10 to about 10,000. The polyethyleneimines may be linear, branched, or hyperbranched (e.g., forming dendritic or arborescent polymer structures). They can be a homopolymer or copolymer of ethyleneimine or mixtures thereof (referred to as polyethyleneimine(s) hereafter). Although linear polymers represented by the chemical formula —[CH2—CH2—NH]— may be used as the polyethyleneimine, materials having primary, secondary, and tertiary branches can also be used. Commercial polyethyleneimine can be a compound having branches of the ethyleneimine polymer.

Suitable polyethyleneimines are commercially available from BASF Corporation under the trade name Lupasol. These compounds can be prepared as a wide range of molecular weights and product activities. Examples of commercial polyethyleneimines sold by BASF suitable for use in the present invention include, but are not limited to, Lupasol FG and Lupasol WF.

Another useful continuity additive can include a mixture of aluminum distearate and an ethoxylated amine-type compound, e.g., IRGASTAT AS-990, available from Huntsman (formerly Ciba Specialty Chemicals). The mixture of aluminum distearate and ethoxylated amine type compound can be slurried in mineral oil e.g., Hydrobrite 380. For example, the mixture of aluminum distearate and an ethoxylated amine type compound can be slurried in mineral oil to have total slurry concentration of ranging from about 5 wt. % to about 50 wt. % or about 10 wt. % to about 40 wt. %, or about 15 wt. % to about 30 wt. %. Other static control agents and additives are applicable.

The continuity additive(s) or static control agent(s) may be added to the reactor in an amount ranging from 0.05 to 200 ppm, based on the weight of all feeds to the reactor, excluding recycle. In some embodiments, the continuity additive may be added in an amount ranging from 2 to 100 ppm, or in an amount ranging from 4 to 50 ppm.

Gas Phase Polymerization Reactor

Figure 2:
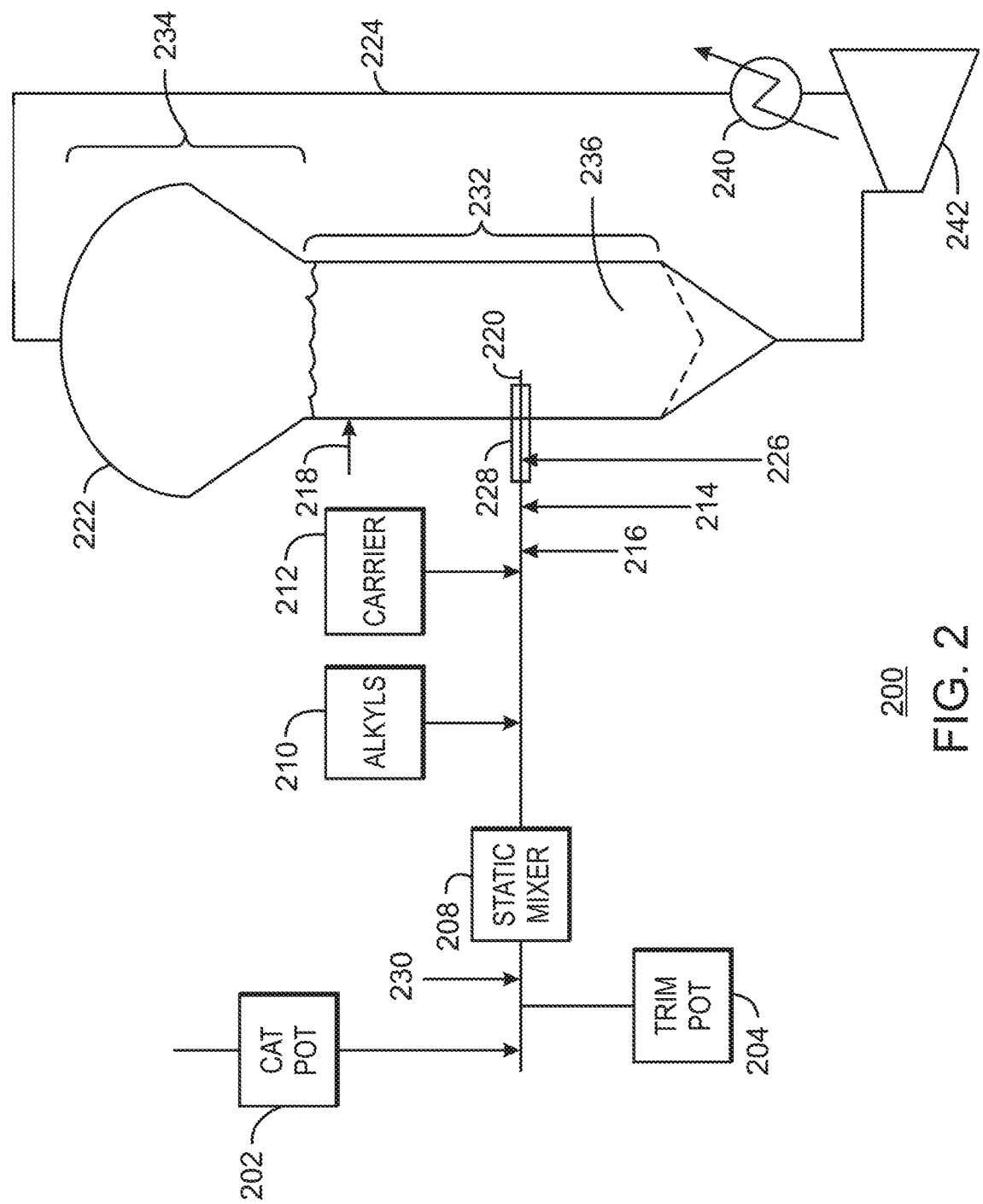
FIG. 2 is a schematic of a gas-phase reactor system, showing the addition of a bimodal polymerization catalyst system that includes a non-metallocene olefin polymerization catalyst and a zirconocene catalyst of Formula I, in accordance with embodiments described herein.

FIG. 2 is a schematic of a gas-phase reactor system, showing the addition of a bimodal polymerization catalyst system that includes a non-metallocene olefin polymerization catalyst and a zirconocene catalyst. The catalyst component slurry (e.g., slurry of Example 1 and/or of Example 2) such as those of preferably a mineral oil slurry including at least one support and at least one activator, at least one supported activator, and optional catalyst compounds may be placed in a vessel or catalyst pot (cat pot) 202. In one embodiment, the cat pot 202 is an agitated holding tank designed to keep the solids concentration homogenous. A catalyst component solution, prepared by mixing a solvent and at least one catalyst compound (e.g., non-metallocene olefin polymerization catalyst and/or zirconocene catalyst) and/or activator, is placed in another vessel, which can be termed a trim pot 204. The catalyst component slurry can then be combined in-line with the catalyst component solution to form a final catalyst composition. Similarly, additional activators or catalyst compounds may be added in-line. For example, a second catalyst slurry that includes a different catalyst may be introduced from a second cat pot. The two catalyst slurries may be used as the catalyst system with or without the addition of a solution catalyst from the trim pot.

The catalyst component slurry and solution can be mixed in-line. For example, the solution and slurry may be mixed by utilizing a static mixer 208 or an agitating vessel (not shown). The mixing of the catalyst component slurry and the catalyst component solution should be long enough to allow the catalyst compound in the catalyst component solution to disperse in the catalyst component slurry such that the catalyst component, originally in the solution, migrates to the supported activator originally present in the slurry. The combination forms a uniform dispersion of catalyst compounds on the supported activator forming the catalyst composition. The length of time that the slurry and the solution are contacted is typically up to about 220 minutes, such as about 1 to about 60 minutes, about 5 to about 40 minutes, or about 10 to about 30 minutes.

In an embodiment, an aluminum alkyl, an ethoxylated aluminum alkyl, an aluminoxane, an anti-static agent or a borate activator, such as a $C_1$ to $C_{15}$ alkyl aluminum (for example tri-isobutyl aluminum, trimethyl aluminum or the like), a $C_1$ to $C_{15}$ ethoxylated alkyl aluminum or methyl aluminoxane, ethyl aluminoxane, isobutylaluminoxane, modified aluminoxane or the like are added to the mixture of the slurry and the solution in line. The alkyls, antistatic agents, borate activators and/or aluminoxanes may be added from an alkyl vessel 210 directly to the combination of the solution and the slurry, or may be added via an additional alkane (such as isopentane, hexane, heptane, and or octane) carrier stream, for example, from a hydrocarbon vessel 212. The additional alkyls, antistatic agents, borate activators and/or aluminoxanes may be present at up to about 500 ppm, at about 1 to about 300 ppm, at 10 to about 300 ppm, or at about 10 to about 100 ppm. Carrier streams that may be used include isopentane and or hexane, among others. The carrier may be added to the mixture of the slurry and the solution, typically at a rate of about 0.5 to about 60 lbs/hr (27 kg/hr). Likewise a carrier gas 214, such as nitrogen, argon, ethane, propane, and the like, may be added in-line to the mixture of the slurry and the solution. Typically the carrier gas may be added at the rate of about 1 to about 100 lb/hr (0.4 to 45 kg/hr), or about 1 to about 50 lb/hr (5 to 23 kg/hr), or about 1 to about 25 lb/hr (0.4 to 11 kg/hr).

In another embodiment, a liquid carrier stream is introduced into the combination of the solution and slurry that is moving in a downward direction. The mixture of the solution, the slurry and the liquid carrier stream may pass through a mixer or length of tube for mixing before being contacted with a gaseous carrier stream.

Similarly, a comonomer 216, such as hexene, another alpha-olefin, or diolefin, may be added in-line to the mixture of the slurry and the solution. The slurry/solution mixture is then passed through an injection tube 220 to a reactor 222. In some embodiments, the injection tube may aerosolize the slurry/solution mixture. Any number of suitable tubing sizes and configurations may be used to aerosolize and/or inject the slurry/solution mixture.

In one embodiment, a gas stream 226, such as cycle gas, or re-cycle gas 224, monomer, nitrogen, or other materials is introduced into a support tube 228 that surrounds the injection tube 220. To assist in proper formation of particles in the reactor 222, a nucleating agent, such as fumed silica, can be added directly into the reactor 222.

When a metallocene catalyst or other similar catalyst is used in the gas phase reactor, oxygen or fluorobenzene can be added to the reactor 222 directly or to the gas stream 226 to control the polymerization rate. Thus, when the zirconocene catalyst of Formula I (which is sensitive to oxygen or fluorobenzene) is used in combination with another catalyst (that is not sensitive to oxygen) in a gas phase reactor, oxygen can be used to modify the zirconocene polymerization rate relative to the polymerization rate of the other catalyst. The addition of water or carbon dioxide to gas phase polymerization reactors, for example, may be applicable for similar purposes. In one embodiment, the contact temperature of the slurry and the solution is in the range of from 0° C. to about 80° C., from about 0° C. to about 60° C., from about 10° C., to about 50° C., and from about 20° C. to about 40° C.

The example above is not limiting, as additional solutions and slurries may be included. For example, a slurry can be combined with two or more solutions having the same or different catalyst compounds and or activators. Likewise, the solution may be combined with two or more slurries each having the same or different supports, and the same or different catalyst compounds and or activators. Similarly, two or more slurries combined with two or more solutions, preferably in-line, where the slurries each comprise the same or different supports and may comprise the same or different catalyst compounds and or activators and the solutions comprise the same or different catalyst compounds and or activators. For example, the slurry may contain a supported activator and two different catalyst compounds, and two solutions, each containing one of the catalysts in the slurry, are each independently combined, in-line, with the slurry.

Use of Catalyst Composition to Control Product Properties

As described in embodiments herein, appropriate selection of the catalysts and ratios may be used to adjust the MWD, short chain branch distribution (SCBD), and long-chain branch distribution (LCBD) of the polymer, for example, to provide a polymer with a broad orthogonal composition distribution (BOCD). The MWD, SCBD, and LCBDs would be controlled by combining catalysts with the appropriate weight average molecular weight (Mw), comonomer incorporation, and long chain branching (LCB) formation under the conditions of the polymerization. For instance, in various embodiments the weight average molecular weight of the low molecular weight polyethylene component can be from 5,000 to 35,000 and/or the weight average molecular weight of the high molecular weight polyethylene component is from 400,000 to 700,000. However, other values are possible depending upon an intended application, etc.

Employing multiple pre-catalysts that are co-supported on a single support mixed with an activator, such as a silica methylaluminoxane (SMAO), can provide a cost advantage by making the product in one reactor instead of multiple reactors. Further, using a single support also facilitates intimate mixing of the polymers and offers improved operability relative to preparing a mixture of polymers of different Mw and density independently from multiple catalysts in a single reactor. As used herein, a pre-catalyst is a catalyst compound prior to exposure to activator.

The density of a polyethylene copolymer provides an indication of the incorporation of comonomer into a polymer, with lower densities indicating higher incorporation. The difference in the densities of the low molecular weight (LMW) component and the high molecular weight (HMW) component can be greater than about 0.02, or greater than about 0.04, with the HMW component having a lower density than the LMW component. These factors can be adjusted by controlling the molecular weight distribution (MWD) and SCBD, which, in turn, can be adjusted by changing the relative amount of the two pre-catalysts on the support. This may be adjusted during the formation of the pre-catalysts, for example, by supporting two catalysts on a single support. In some embodiments, the relative amounts of the pre-catalysts can be adjusted by adding one of the components to a catalyst mixture such as a bimodal polymerization catalyst system en-route to the reactor in a process termed "trim". Feedback of polymer property data can be used to control the amount of catalyst addition. Metallocenes (MCNs) such as zirconocenes are known to trim well with other catalysts.

The properties of the product polymer may be controlled by adjusting the timing, temperature, concentrations, and sequence of the mixing of the solution, the slurry and any optional added materials (nucleating agents, catalyst compounds, activators, etc.) described above. The MWD, melt index, relative amount of polymer produced by each catalyst, and other properties of the polymer produced may also be changed by manipulating process parameters. Any number of process parameters may be adjusted, including manipulating hydrogen concentration in the polymerization system, changing the amount of the first catalyst in the polymerization system, changing the amount of the second catalyst in the polymerization system. Other process parameters that can be adjusted include changing the relative ratio of the catalyst in the polymerization process (and optionally adjusting their individual feed rates to maintain a steady or constant polymer production rate). The concentrations of reactants in the reactor 222 can be adjusted by changing the amount of liquid or gas that is withdrawn or purged from the process, changing the amount and/or composition of a recovered liquid and/or recovered gas returned to the polymerization process, where the recovered liquid or recovered gas can be recovered from polymer discharged from the polymerization process. Further concentration parameters that can be adjusted include changing the polymerization temperature, changing the ethylene partial pressure in the polymerization process, changing the ethylene to comonomer ratio in the polymerization process, changing the activator to transition metal ratio in the activation sequence. Time dependent parameters may be adjusted, such as changing the relative feed rates of the slurry or solution, changing the mixing time, the temperature and or degree of mixing of the slurry and the solution in-line, adding different types of activator compounds to the polymerization process, and adding oxygen or fluorobenzene or other catalyst poison to the polymerization process. Any combinations of these adjustments may be used to control the properties of the final polymer product.

In one embodiment, the MWD of the polymer product is measured at regular intervals and one of the above process parameters, such as temperature, catalyst compound feed rate, the ratios of the two or more catalysts to each other, the ratio of comonomer to monomer, the monomer partial pressure, and or hydrogen concentration, is altered to bring the composition to the desired level, if necessary. The MWD may be measured by size exclusion chromatography (SEC), e.g., gel permeation chromatography (GPC), among other techniques.

In one embodiment, a polymer product property is measured in-line and in response the ratio of the catalysts being combined is altered. In one embodiment, the molar ratio of the catalyst compound in the catalyst component slurry to the catalyst compound in the catalyst component solution, after the slurry and solution have been mixed to form the final catalyst composition, is 500:1 to 1:500, or 100:1 to 1:100, or 50:1 to 1:50 or 40:1 to 1:10. In another embodiment, the molar ratio of a non-metallocene olefin polymerization catalyst compound in the slurry to a zirconocene catalyst compound in the solution, after the slurry and solution have been mixed to form the catalyst composition, is 500:1, 100:1, 50:1, 10:1, or 5:1. The product property measured can include the dynamic shear viscosity, flow index, melt index, density, MWD, comonomer content, and combinations thereof, among other possibilities. In another embodiment, when the ratio of the catalyst compounds is altered, the introduction rate of the catalyst composition to the reactor, or other process parameters, is altered to maintain a desired production rate.

Polymerization Process

The bimodal polymerization catalyst system can be used to polymerize one or more olefins to provide one or more polymer products therefrom. Any suitable polymerization process can be used, including, but not limited to, high pressure, solution, slurry, and/or gas phase polymerization processes. In embodiments that use other techniques besides gas phase polymerization, modifications to a catalyst addition system that are similar to those discussed with respect to FIG. 2 can be used. For example, a trim system may be used to feed catalyst to a loop slurry reactor for polyethylene copolymer production.

The terms "polyethylene" and "polyethylene copolymer" refer to a polymer having at least 50 wt. % ethylene-derived units. In various embodiments, the polyethylene can have at least 70 wt. % ethylene-derived units, at least 80 wt. % ethylene-derived units, at least 90 wt. % ethylene-derived units, or at least 95 wt. % ethylene-derived units. The polyethylene polymers described herein are generally copolymer, but may also include terpolymers, having one or more other monomeric units. As described herein, a polyethylene can include, for example, at least one or more other olefins or comonomers. Suitable comonomers can contain 3 to 16 carbon atoms, from 3 to 12 carbon atoms, from 4 to 10 carbon atoms, and from 4 to 8 carbon atoms. Examples of comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

Referring again to FIG. 2, the fluidized bed reactor 222 can include a reaction zone 232 and a velocity reduction zone 234. The reaction zone 232 can include a bed 236 that includes growing polymer particles, formed polymer particles and a minor amount of catalyst particles fluidized by the continuous flow of the gaseous monomer and diluent to remove heat of polymerization through the reaction zone. Optionally, some of the re-circulated gases 224 can be cooled and compressed to form liquids that increase the heat removal capacity of the circulating gas stream when readmitted to the reaction zone. A suitable rate of gas flow can be readily determined by experimentation. Make-up of gaseous monomer to the circulating gas stream can be at a rate equal to the rate at which particulate polymer product and monomer associated therewith is withdrawn from the reactor and the composition of the gas passing through the reactor can be adjusted to maintain an essentially steady state gaseous composition within the reaction zone. The gas leaving the reaction zone 232 can be passed to the velocity reduction zone 234 where entrained particles are removed, for example, by slowing and falling back to the reaction zone 232. If desired, finer entrained particles and dust can be removed in a separation system such as a cyclone and/or fines filter. The gas 224 can be passed through a heat exchanger 240 where at least a portion of the heat of polymerization can be removed. The gas can then be compressed in a compressor 242 and returned to the reaction zone 232. Additional reactor details and means for operating the reactor 222 are applicable.

The reactor temperature of the fluid bed process can be greater than about 30° C., about 40° C., about 50° C., about 90° C., about 100° C., about 110° C., about 120° C., about 150° C., or higher. In general, the reactor temperature is operated at the highest feasible temperature taking into account the sintering temperature of the polymer product within the reactor. Thus, the upper temperature limit in one embodiment is the melting temperature of the polyethylene copolymer produced in the reactor. However, higher temperatures may result in narrower MWDs, which can be improved by the addition of other co-catalysts, as described herein.

Hydrogen gas can be used in olefin polymerization to control the final properties of the polyolefin, such as described in the "Polypropylene Handbook," at pages 76-78 (Hanser Publishers, 1996). Using certain catalyst systems, increasing concentrations (partial pressures) of hydrogen can increase the flow index (FI), or melt index (MI) of the polyethylene copolymer generated. The flow index can thus be influenced by the hydrogen concentration. The amount of hydrogen in the polymerization can be expressed as a mole ratio relative to the total polymerizable monomer, for example, ethylene, or a blend of ethylene and hexene or propylene.

The amount of hydrogen used in the polymerization process can be an amount necessary to achieve the desired flow index of the final polyolefin polymer. For example, the mole ratio of hydrogen to total monomer (H2:monomer) can be greater than about 0.0001, greater than about 0.0005, or greater than about 0.001. Further, the mole ratio of hydrogen to total monomer (H2:monomer) can be less than about 10, less than about 5, less than about 3, and less than about 0.10. A desirable range for the mole ratio of hydrogen to monomer can include any combination of any upper mole ratio limit with any lower mole ratio limit described herein. Expressed another way, the amount of hydrogen in the reactor at any time can range to up to about 5,000 ppm, up to about 4,000 ppm in another embodiment, up to about 3,000 ppm, or between about 50 ppm and 5,000 ppm, or between about 50 ppm and 2,000 ppm in another embodiment. The amount of hydrogen in the reactor can range from a low of about 1 ppm, about 50 ppm, or about 100 ppm to a high of about 400 ppm, about 800 ppm, about 1,000 ppm, about 1,500 ppm, or about 2,000 ppm, based on weight. Further, the ratio of hydrogen to total monomer (H2:monomer) can be about 0.00001:1 to about 2:1, about 0.005:1 to about 1.5:1, or about 0.0001:1 to about 1:1. The one or more reactor pressures in a gas phase process (either single stage or two or more stages) can vary from 690 kPa (100 psig) to 3,448 kPa (500 psig), in the range from 1,379 kPa (200 psig) to 2,759 kPa (400 psig), or in the range from 1,724 kPa (250 psig) to 2,414 kPa (350 psig).

The gas phase reactor can be capable of producing from about 10 kg of polymer per hour (25 lbs/hr) to about 90,900 kg/hr (200,000 lbs/hr), or greater, and greater than about 455 kg/hr (1,000 lbs/hr), greater than about 4,540 kg/hr (10,000 lbs/hr), greater than about 11,300 kg/hr (25,000 lbs/hr), greater than about 15,900 kg/hr (35,000 lbs/hr), and greater than about 22,700 kg/hr (50,000 lbs/hr), and from about 29,000 kg/hr (65,000 lbs/hr) to about 45,500 kg/hr (100,000 lbs/hr).

As noted, a slurry polymerization process can also be used in embodiments. A slurry polymerization process generally uses pressures in the range of from about 101 kPa (1 atmosphere) to about 5,070 kPa (50 atmospheres) or greater, and temperatures in the range of from about 0° C. to about 120° C., and more particularly from about 30° C. to about 100° C. In a slurry polymerization, a suspension of solid, particulate polymer can be formed in a liquid polymerization diluent medium to which ethylene, comonomers, and hydrogen along with catalyst can be added. The suspension including diluent can be intermittently or continuously removed from the reactor where the volatile components are separated from the polymer and recycled, optionally after a distillation, to the reactor. The liquid diluent employed in the polymerization medium can be an alkane having from 3 to 7 carbon atoms, such as, for example, a branched alkane. The medium employed should be liquid under the conditions of polymerization and relatively inert. When a propane medium is used the process should be operated above the reaction diluent critical temperature and pressure. In one embodiment, a hexane, isopentane, or isobutane medium can be employed. The slurry can be circulated in a continuous loop system.

A number of tests can be used to compare resins from different sources, catalyst systems, and manufacturers. Such tests can include melt index, high load melt index, melt index ratio, density, dies swell, environmental stress crack resistance, and many others. Results of tests runs on resins made in embodiments described herein are presented in the examples section.

As used herein, Mn is number average molecular weight, Mw is weight average molecular weight, and Mz is z average molecular weight, wt % is weight percent, and mol % is mole percent.

Mw, Mn, Mz, and Mw/Mn are determined by using a High Temperature Gel Permeation Chromatography (Polymer Laboratories), equipped with a differential refractive index detector (DRI). Three Polymer Laboratories PLgel 10 μm Mixed-B columns are used. The nominal flow rate is 1.0 mL/min, and the nominal injection volume is 300 μL. The various transfer lines, columns, and differential refractometer (the DRI detector) are contained in an oven maintained at 160° C. Solvent for the experiment is prepared by dissolving 6 grams of butylated hydroxytoluene as an antioxidant in 4 liters of Aldrich reagent grade 1, 2, 4 trichlorobenzene (TCB). The TCB mixture is then filtered through a 0.1 μm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/ml, with lower concentrations being used for higher molecular weight samples. Prior to running each sample the DRI detector is purged. Flow rate in the apparatus is then increased to 1.0 ml/minute, and the DRI is allowed to stabilize for 8 hours before injecting the first sample. The molecular weight is determined by combining universal calibration relationship with the column calibration which is performed with a series of monodispersed polystyrene (PS) standards. The MW is calculated at each elution volume with following equation:

$$\log M_X = \frac{\log(K_X/K_{PS})}{a_X+1} + \frac{a_{PS}+1}{a_X+1}\log M_{PS}$$

where the variables with subscript "X" stand for the test sample while those with subscript "PS" stand for PS. In this method, $\alpha_{PS}=0.67$ and $K_{PS}=0.000175$ while $\alpha_X$ and $K_X$ are obtained from published literature. Specifically, a/K=0.695/0.000579 for PE and 0.705/0.0002288 for PP.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. Specifically, dn/dc=0.109 for polyethylene.

The mass recovery is calculated from the ratio of the integrated area of the concentration chromatography over elution volume and the injection mass which is equal to the pre-determined concentration multiplied by injection loop volume.

Comonomer content (i.e., 1-hexene) incorporated in the polymers (weight %)) was determined by rapid FT-IR spectroscopy on the dissolved polymer in a GPC measurement.

The product polyethylene can have a melt index ratio (MIR or I21/I2) ranging from about 10 to less than about 300, or, in many embodiments, from about 15 to about 150. Flow index (FI, HLMI, or I21 can be measured in accordance with ASTM D1238 (190° C., 21.6 kg). The melt index (MI, I2) can be measured in accordance with ASTM D1238 (at 190° C., 2.16 kg weight). The melt index (MI, I5) can be measured in accordance with ASTM D1238 (190° C., 5 kg). Another melt index (MI, I21) can be measured in accordance with ASTM D1238 (190° C., 21.6 kg).

Density can be determined in accordance with ASTM D-792. Density is expressed as grams per cubic centimeter (g/cm3) unless otherwise noted. The polyethylene can have a density ranging from a low of about 0.89 g/cm3, about 0.90 g/cm3, or about 0.91 g/cm3 to a high of about 0.95 g/cm3, about 0.96 g/cm3, or about 0.97 g/cm3. The polyethylene can have a bulk density, measured in accordance with ASTM D1895 method B, of from about 0.25 g/cm3 to about 0.5 g/cm3. For example, the bulk density of the polyethylene can range from a low of about 0.30 g/cm3, about 0.32 g/cm3, or about 0.33 g/cm3 to a high of about 0.40 g/cm3, about 0.44 g/cm3, or about 0.48 g/cm3. In some embodiments, the bimodal polyethylene composition can have a density of 0.940 gram/cubic centimeters or more.

The polyethylene (e.g., a HDPE) can be suitable for such articles as films, fibers, nonwoven and/or woven fabrics, extruded articles, and/or molded articles. Examples of films include blown or cast films formed in single layer extrusion, coextrusion, or lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions by injection molding or rotation molding or blow molding processes in the form of bottles, tanks, large hollow articles, rigid food containers and toys, etc.

All numerical values are "about" or "approximately" the indicated value, and take into account experimental error and variations that would be expected by a person having ordinary skill in the art. Further, various terms have been defined above. To the extent a term used in a claim is not defined above, it should be given the broadest definition persons in the pertinent art have given that term as reflected in at least one printed publication or issued patent. All patents, test procedures, and other documents cited in this application are fully incorporated by reference to the extent such disclosure is not inconsistent with this application and for all jurisdictions in which such incorporation is permitted. While the foregoing is directed to embodiments of the present invention, other and further embodiments of the invention can be devised without departing from the basic scope thereof, and the scope thereof is determined by the claims that follow.

EXAMPLES

Sample Catalyst Preparation

The bimodal polymerization catalyst system used in the Examples summarized in Table 1 below were made by a process identical to or similar to the following sample catalyst preparation process. Components and amounts in the sample catalyst preparation process below were adjusted, as needed, to make catalysts having the ratio of components, metal weight percent, slurry wt. %, and other properties as summarized in Table 1 below. That is, as used herein, a bimodal polymerization catalyst system refers to a catalyst system including a base catalyst and a trim catalyst.

Base Catalyst: A high-molecular weight base polymerization catalyst system was prepared by mixing approximately 11.2 kilograms of a 10% solution by weight of MAO in toluene, approximately 17 kilograms of toluene, and approximately 1.75 kilograms of treated fumed silica (Cabosil TS-610). To this mixture, approximately 45.4 grams of non-metallocene olefin polymerization catalyst structure supplied by Koei Science Company. The resulting mixture was introduced into an atomizing device, producing droplets that were then contacted with a hot nitrogen gas stream to evaporate the liquid and form a powder. The powder was separated from the gas mixture in a cyclone separator and collected in a cone can. One kilogram of the solid powder catalyst was charged into an agitated vessel containing 4.0 kilograms of Hydrobrite 380 PO mineral oil from Sonneborne and 0.56 kilograms of ISOPAR-C from ExxonMobil Chemical Company, Houston, Tex. The slurry of was then employed for polymerization reactions, mixing with appropriate trim solution (from Example 1, Example 2, below) to vary the low molecular weight polymer component, as described in the Examples.

Example 1: The trim solution of Example 1 is a one weight percent solution of the metallocene of Formula II in hexane (99 weight percent of hexane). The metallocene of Formula II may be prepared by the following procedure:

Indene (15.0 mL) is dissolved in hexane (200 mL) and n-butyllithium (88.4 mL, 1.6M in hexanes) is added slowly. After stirring overnight, the white precipitate is collected by filtration, washed with hexane, and dried in vacuo to yield 15.25 g of indenyllithium. Indenyllithium (6.64 g) is slurried in ether (70 mL) and cooled to −40° C. Iodomethane (4.1 mL) is added, and the reaction stirred overnight as it warms to room temperature. Volatiles are removed in vacuo, and hexane (100 mL) is added to the residue. After filtering, n-butyllithium (35.7 mL, 1.6M in hexanes) is added to the filtrate and the mixture stirred overnight as a white precipitate develops. The white solid is collected by filtration, washed with hexane, and dried to yield 4.932 g of 1-methylindenyllithium. 1-Methylindenyllithium and (Me$_4$Cp)ZrCl$_3$ are combined in ether and stirred overnight. Solvents are removed in vacuo to yield a solid. After extracting into dichloromethane and filtering, solvents are removed from the filtrate in vacuo to yield a bright yellow solid that is recrystallized from dichloromethane/hexane to yield (Me4Cp)(1-MeInd)ZrCl$_2$. In a Parr pressure vessel, (Me$_4$Cp)(1-MeInd)ZrCl$_2$ is dissolved in dichloromethane and a catalytic amount of PtO$_2$ is added. The vessel is pressurized to 75 psig with hydrogen, and stirred overnight. The reaction mixture is vented, and the mixture is filtered. Removal of solvents in vacuo from the filtrate yields (Me$_4$Cp)(1-Me-H$_4$-Ind)ZrCl$_2$ as a white solid. The (Me$_4$Cp)(1-Me-H$_4$-Ind)ZrCl$_2$ is slurried in ether, and two equivalents of methylmagnesiumbromide are added slowly. After stirring overnight, solvents are removed from the reaction in vacuo and hexane is added. The mixture is filtered, and the filtrate evaporated to dryness to yield (Me$_4$Cp)(1-Me-H$_4$-Ind)ZrMe$_2$.

Example 2: The trim solution of Example 2 is a one weight percent solution of the metallocene of Formula III in hexane (99 weight percent of hexane). The metallocene of Formula III may be prepared by the following procedure:

1,2,4-Trimethylcyclopentadiene is dissolved in hexane (200 mL) and n-butyllithium (88.4 mL, 1.6M in hexanes) is added slowly. After stirring overnight, the white precipitate is collected by filtration, washed with hexane, and dried in vacuo to yield 1,2,4-trimethylcyclopentadienyllithium.

Trimethylcyclopentadienyllithium is dissolved in THF at room temperature. Propionaldehyde (1.5 equivalents) is added to the reaction mixture which is allowed to stir overnight. Water and ether are added. The organic layer is separated, dried over MgSO4, filtered and solvents evaporated to yield 1,2,4-trimethyl-5-propylidenecyclopenta-1,3-diene.

1,2,4-Trimethyl-5-propylidenecyclopenta-1,3-diene is dissolved in ether and one equivalent of lithium aluminum hydride is added slowly at room temperature. The solvents are removed in vacuo, and the residue is washed with hexane to yield 1,3,4-Trimethyl-2-propylcyclopentadienyllithium.

1,3,4-Trimethyl-2-propylcyclopentadienyllithium and (Me$_4$Cp)ZrCl$_3$ are combined with ether and the resulting slurry is stirred overnight. Solvents are removed in vacuo to yield a solid. After extracting into dichloromethane and filtering, solvents are removed from the filtrate in vacuo to yield a solid that can be recrystallized from dichloromethane/hexane to yield.

The (Me$_4$Cp)(1,3,4-Me$_3$-2-PrCp)ZrCl$_2$ is slurried in ether, and methylmagnesium-bromide (2 equivalents) is added slowly. After stirring overnight, solvents are removed from the reaction in vacuo and hexane is added. The mixture is filtered, and the filtrate evaporated to dryness to obtain (Me$_4$Cp)(1,3,4-Me$_3$-2-PrCp)ZrMe$_2$.

Comparative Example 1 Base Catalyst: A bimodal base polymerization catalyst system was prepared by mixing approximately 11.2 kilograms of a 10% solution by weight of MAO in toluene, approximately 17 kilograms of toluene, and approximately 1.75 kilograms of treated fumed silica (Cabosil TS-610). To this mixture, approximately 71 grams of non-metallocene olefin polymerization catalyst structure supplied by Koei Science Company and 13 g of the metallocene (PrCp)(Me$_4$Cp)ZrCl$_2$ obtained from Boulder Scientific Company. The resulting mixture was introduced into an atomizing device, producing droplets that were then contacted with a hot nitrogen gas stream to evaporate the liquid and form a powder. The powder was separated from the gas mixture in a cyclone separator and collected in a cone can. One kilogram of the solid powder catalyst was charged into an agitated vessel containing 4.0 kilograms of Hydrobrite 380 PO mineral oil from Sonneborne and 0.56 kilograms of ISOPAR-C from ExxonMobil Chemical Company, Houston, Tex. The slurry of was then employed for polymerization reactions, mixing with the following trim solution Comparative Example 1 Trim Solution: A trim solution is prepared containing a one weight percent solution of the metallocene (PrCp)(Me$_4$Cp)ZrMe$_2$, obtained from Boulder Scientific Company, in hexane (99 weight percent of hexane).

TABLE 1

Example Data (for Example 1 (Ex1), Example 2 (Ex 2), Comparative Example 1 (CE 1))

| | Temperature (° C.) | H2/C2 | C6/C2 | Density (g/cm3) | $I_{21}$ | $I_5$ | $I_{21}/I_5$ |
|---|---|---|---|---|---|---|---|
| Ex 1 | 105 | 0.0020 | 0.095 | 0.9525 | 5.8 | 0.11 | 51 |
| Ex 2 | 95 | 0.0028 | 0.0145 | 0.9494 | 5.3 | 0.13 | 40 |
| Ce 1 | 105 | 0.0020 | 0.005 | 0.9496 | 5.6 | 0.16 | 35 |

As shown in FIG. 1, Examples 1 and 2 have a desirable molecular weight distribution, in contrast to Comparative Example 1. For example, the weight average molecular weight of the low molecular weight polyethylene component of Examples 1 and 2 is from approximately 5,000 (corresponding to approximately a log MW of 3.69) to approximately 35,000 g/mol as represented by a first peak (104-1 and 106-1, respectively) in a molecular weight distributions of the polyethylenes of Examples 1 and 2. In contrast, the weight average molecular weight of the low molecular weight polyethylene component of Comparative Example 1 is from approximately 10,000 to approximately 100,000 g/mol as represented by a first peak 102-1 in a molecular weight distribution of the polyethylene of Comparative Example 1.

Additionally, Examples 1 and 2, in contrast to Comparative Example 1, have a desired distribution of comonomer at a high molecular weight polyethylene component and at a low molecular weight polyethylene component of the bimodal polyethylene compositions of Examples 1 and 2. For instance, Examples 1 and 2 have comonomer present in an amount from approximately 3.0 wt. % to approximately 6.0 wt. % of a high molecular weight polyethylene at a second peak (104-2, 106-2, respectively) in a molecular weight distribution of the polyethylenes of Examples 1 and 2. In contrast, Comparative Example 1 has comonomer present in an amount from approximately 1.5 wt. % to approximately 2.5 wt. % of a high molecular weight polyethylene at a second peak (102-2) in a molecular weight distribution of the polyethylene of Comparative Example 1.

Having more comonomer in the high molecular weight polyethylene component and/or have desired molecular weight distribution of the low and high molecular weight polyethylene components can desirably promote improved physical and/or mechanical properties, specifically slow crack growth resistance for high performance pipe applications as compared to other approaches (e.g., Comparative Example 1). For instance, in various embodiments the bimodal polyethylene compositions, described herein, qualify as a PE 100 material such that in accordance with ISO 1167 a pipe formed from the composition that is subjected to internal pipe resistance has an extrapolated stress of 10 megapascals (MPa) or more when the internal pipe resistance curve is extrapolated to 100 years in accordance with ISO 9080:2003(E). Pipes having such properties may be desirable for a variety of applications such as pressure pipe applications in which a pipe may be exposed to high pressure during an operational lifetime of the pipe.

What is claimed:

1. A bimodal polymerization catalyst system comprising:
a non-metallocene olefin polymerization catalyst; and
a zirconocene catalyst of Formula I:

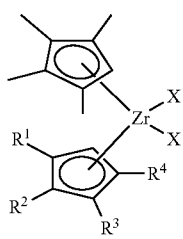

(Formula I)

where $R^4$ is independently a $C_1$ alkyl or a hydrogen, where $R^3$ is a $C_1$ to $C_{20}$ alkyl, aryl or aralkyl group, where each X is independently a halide, $C_1$ to $C_{20}$ alkyl, aralkyl group or hydrogen; and where $R^1$ and $R^2$ of Formula I together, with the carbon atoms to which they are bonded, form a cycloalkyl group; or $R^1$ is a $C_1$ alkyl and $R^2$ is a $C_3$ alkyl.

2. The bimodal polymerization catalyst system of claim 1, wherein the non-metallocene olefin polymerization catalyst comprises a Group 15 metal-containing catalyst compound.

3. The bimodal polymerization catalyst system of claim 1, wherein the non-metallocene olefin polymerization catalyst comprises a catalyst of the formula:

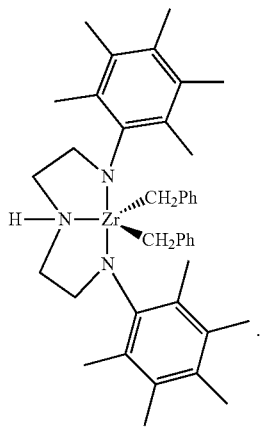

4. The bimodal polymerization catalyst system of claim 1, where $R^3$ of Formula I is a $C_1$ to $C_{20}$ alkyl.

5. A method of producing a bimodal polyethylene, the method comprising:
polymerizing ethylene in a single reactor in presence of a bimodal polymerization catalyst system to form the bimodal polyethylene, wherein the bimodal polymerization catalyst system comprises:
a non-metallocene olefin polymerization catalyst; and
a zirconocene catalyst of Formula I:

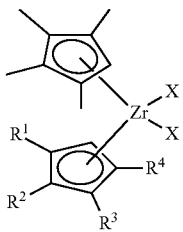

(Formula I)

where $R^4$ is independently a $C_1$ alkyl or a hydrogen, where $R^3$ is a $C_1$ to $C_{20}$ alkyl, aryl or aralkyl group, where each X is independently a halide, $C_1$ to $C_{20}$ alkyl, aralkyl group or hydrogen, and where:

$R^1$ and $R^2$ of Formula I together, with the carbon atoms to which they are bonded, form a cycloalkyl group; or $R^1$ is a $C_1$ alkyl and $R^2$ is a $C_3$ alkyl.

6. The method of claim 5, further comprising forming a slurry including the non-metallocene olefin polymerization catalyst.

7. The method of claim 6, further comprising forming a trim solution including the zirconocene catalyst of Formula I.

8. The method of claim 7, further comprising mixing the slurry with the trim solution to form the bimodal polymerization catalyst system.

9. A bimodal polymerization catalyst system comprising:
a non-metallocene olefin polymerization catalyst; and
a zirconocene catalyst of Formula I:

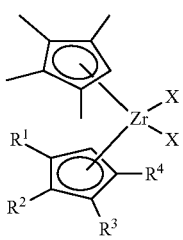

(Formula I)

wherein $R^1$ is a $C_1$ alkyl, $R^2$ is a $C_3$ alkyl, $R^4$ is a $C_1$ alkyl, $R^3$ is a $C_1$ to $C_{20}$ alkyl, aryl or aralkyl group, and each X is independently a halide, $C_1$ to $C_{20}$ alkyl, aralkyl group or hydrogen.

* * * * *